UNITED STATES PATENT OFFICE.

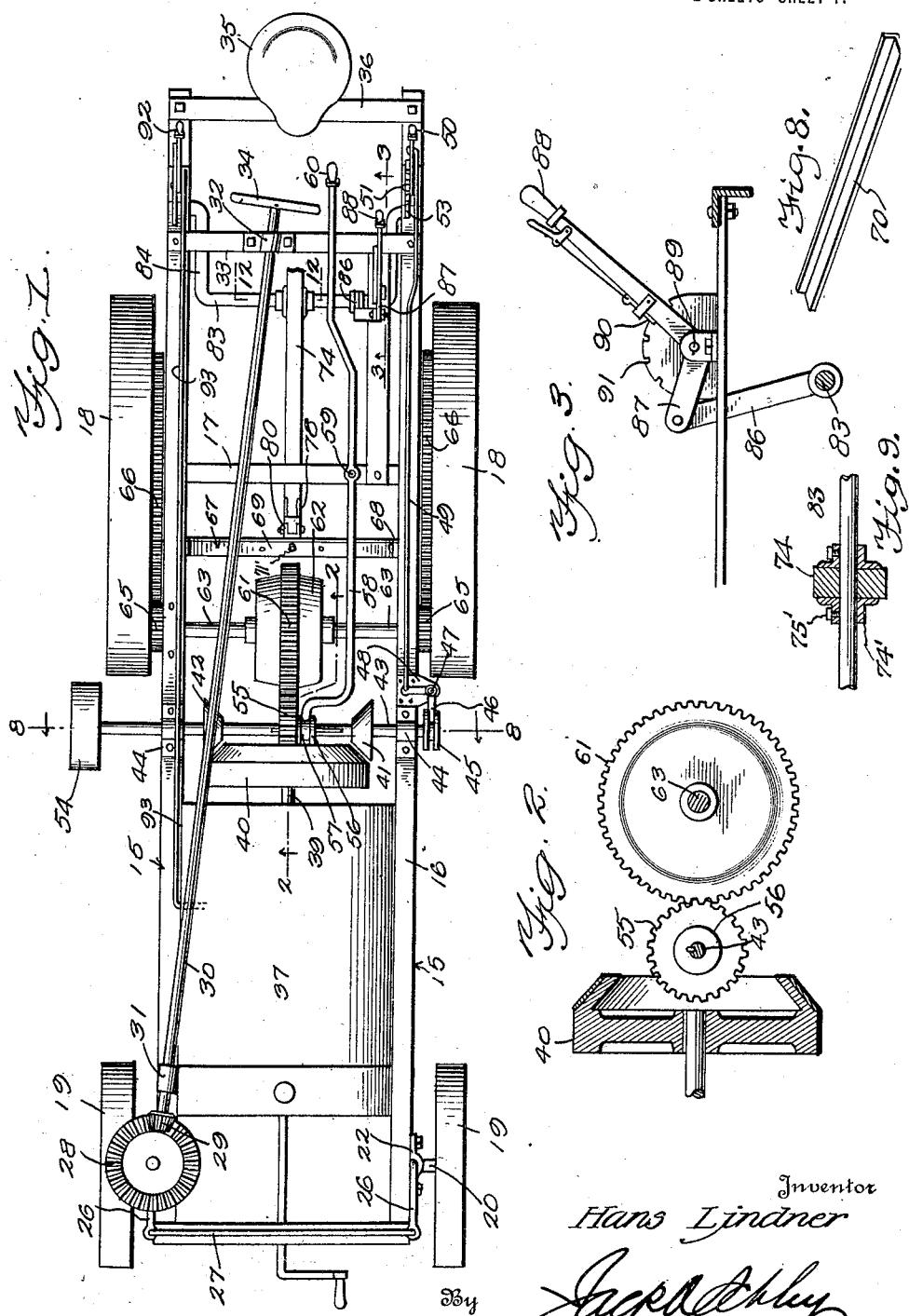

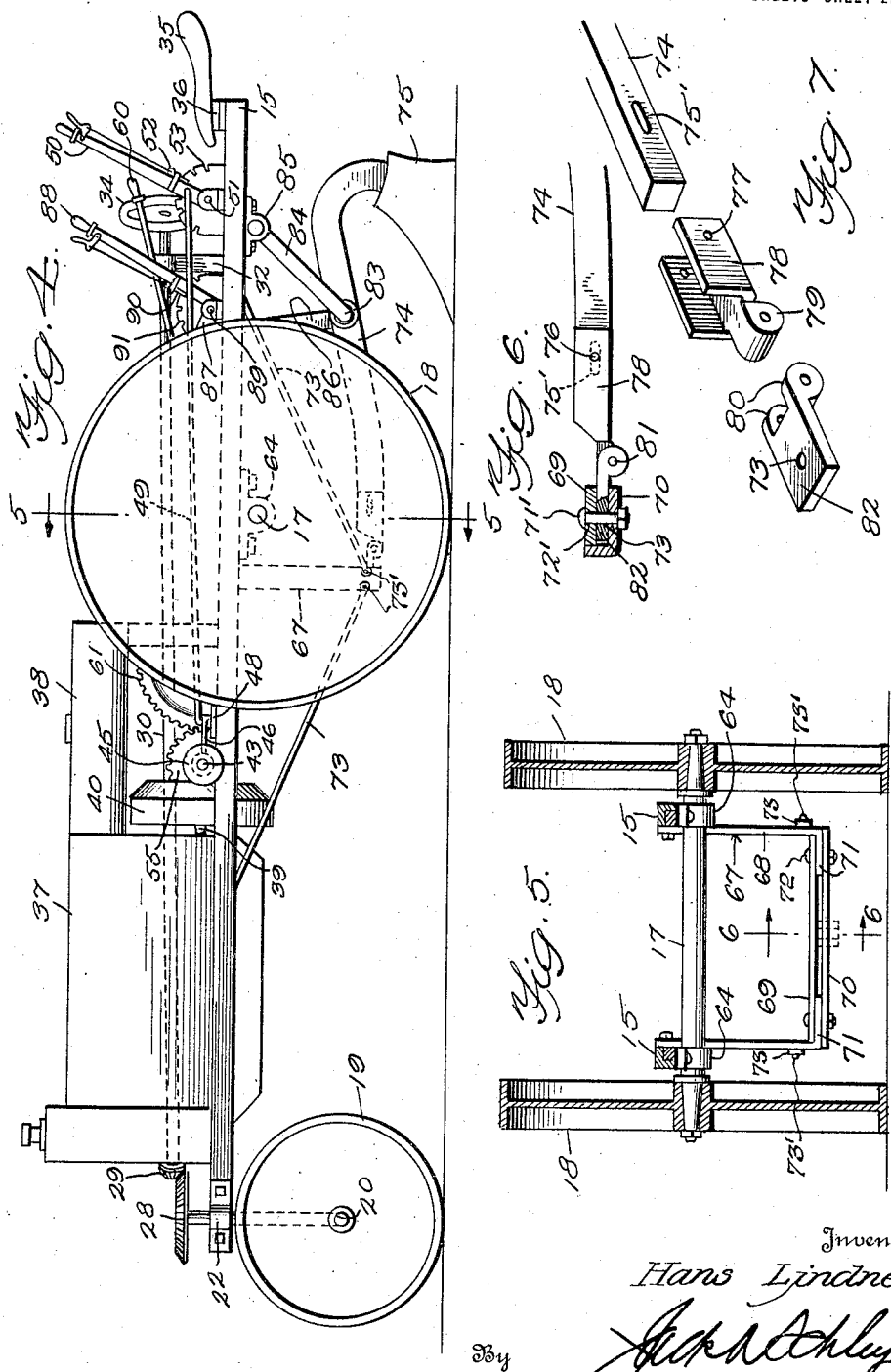

HANS LINDNER, OF WOODSBORO, TEXAS.

TRACTOR.

1,427,399.

Specification of Letters Patent.

Patented Aug. 29, 1922.

Application filed September 15, 1920. Serial No. 410,439.

*To all whom it may concern:*

Be it known that I, HANS LINDNER, a citizen of the United States, residing at Woodsboro, in the county of Refugio and State of Texas, have invented certain new and useful Improvements in Tractors, of which the following is a specification.

My invention relates to improvements in tractors, designed for agricultural purposes. An important object of the invention is to provide a draw bar, carried by the frame of the tractor, and so constructed that a plow beam, or cultivator beams may be readily secured thereto.

A further object of the invention is to provide simple and strong coupling means between the plow or cultivator beams and the draw bar.

Other objects and advantages of the invention will be apparent during the course of the following description.

In the accompanying drawings forming a part of this specification, and in which like numerals are employed to designate like parts throughout the same, Figure 1 is a plan view of a tractor embodying my invention, Figure 2 is a longitudinal section taken on line 2—2 of Figure 1, Figure 3 is a similar view taken on line 3—3 of Figure 1, Figure 4 is a side elevation of the tractor, Figure 5 is a transverse section taken on line 5—5 of Figure 4, Figure 6 is a side elevation of the plow beam coupling, parts in elevation, Figure 7 is a perspective view of the same, with the elements separated, Figure 8 is a perspective view of a lower bar included in the draw-bar, and Figure 9 is a detail section taken on line 9—9 of Figure 1.

In the drawings, wherein for the purpose of illustration is shown a preferred embodiment of my invention, the numeral 15 designates the main frame of the tractor, having its rear portion supported by a transverse axle 17, suitably connected therewith, and carrying traction wheels 18, rotatable thereon.

The forward end of the main frame 15 is supported by wheels 19, rotatable upon axles 20, which are swung for steering by a gear 28 and associated elements. The bevel gear 28 is driven by a bevel gear 29. The bevel gear 29 is carried by a steering shaft 30, having its forward portion journaled through a bearing 31, and its rear portion through a bearing 32, carried by a transverse bar or strap 33. This bar or strap is rigidly attached to the beams 16. The shaft 30 is turned by a hand-wheel 34, secured to the rear end thereof, in proximity to an operator's seat 35, suitably mounted upon a spring 36. This spring is secured to the frame 15, at its rear end.

Suitably mounted upon the forward portion of the main frame 15 is an internal combustion engine 37, of any well known or preferred type. This engine may have a gasoline tank 38, arranged as shown. The engine has a crank shaft 39, provided at its rear end with a friction bevel gear 40, adapted to be engaged by friction bevel gears 41 and 42, rigidly mounted upon a transverse drive shaft 43, journaled in bearings 44. These bearings are rigidly mounted upon the beams 16. The shaft 43 is loosely mounted within the bearings 44, to turn and move longitudinally therein, and is provided at one end with a grooved collar 45, slidably receiving one end of a bell crank lever 46, pivoted at 47, to a bracket 48, carried by the beam 16. The bell crank lever is swung in either direction by a longitudinal rod or link 49, pivotally connected at its rear end to a lever 50, pivoted to the frame, at 51. This lever is equipped with the usual latch means 52, to coact with a toothed quadron 53, whereby the lever may be locked in a desired adjusted position, as is well known. By operating the lever 50, the shaft 43 may be shifted to the neutral position, with both friction gears 41 and 42 disengaging the gear 40 or either gear 41 and 42 may engage the gear 40, thereby driving the shaft 43 in either direction. A power take off pulley 54 is rigidly secured to one end of the transverse shaft.

A sliding gear 55 is keyed upon the shaft 43, to move longitudinally thereof, and rotate therewith, and this gear has a hub 56, provided with an annular groove 57, for receiving the forked end of a shifting lever 58, pivoted at 59, upon the bar 17. The lever 58 has its rear end 60 disposed near the seat 33. The shifting gear 55 is adapted to engage and disengage an annular gear 61, formed upon the exterior of a differential gear casing 62. The differential gear within the casing 62 may be of any well known or preferred construction, serving to drive shaft sections 63, journaled through bearing 64. These shaft sections carry bull pinions 65, engaging bull gears 66, secured to the traction wheels 18, to rotate therewith.

Arranged near and rearwardly of the shaft sections 63 is a substantially U-shaped draw bar 67, which as more clearly shown in Figure 5 includes vertical L-shaped bars 68, the upper ends of which are suitably attached to the beams 15. Horizontal bars 69 and 70 are arranged above and below the horizontal portions 71, of the L-shaped bars, and are attached thereto by bolts 72. Diagonal braces 73 are connected with the draw bar, near its bottom by bolt 73', and extend upwardly for suitable connection with the frame 15.

The numeral 74 designates a plow beam, carrying a plow share 75. The forward end of this plow beam, Figure 7, is provided with an elongated opening 75', for receiving a pin or bolt 76, extending through apertures 77 in a coupling sleeve 78. This coupling sleeve is provided with an apertured knuckle 79, to pass between apertured knuckles 80, and be pivoted thereto by a pin 81. The knuckles 80 are carried by a coacting coupling plate 82, adapted for insertion between the bars 69 and 70, and held therein by a bolt 71', passing through selected apertures 72' and 73', as clearly shown in Figure 6. The rear portion of the plow beam 74 has an opening to pivotally receive a swing 83, having cranks 84, the upper ends of which are pivoted within bearings 85, Figure 4. The swing is raised by a link 86, pivoted thereto and pivotally connected with a crank 87, moved by a lever 88, pivoted at 89. The lever 89 carries latch means 90, to engage a toothed quadrant 81 to lock it against movement. Upon opposite sides of the plow beam 74, and slidable upon the swing 83, are sleeves or disks 74', adapted to be clamped to the swing by bolts 75'. By this means the plow beam may be adjusted longitudinally of the swing and clamped thereto in adjustment, the forward end of the plow beam being transversely adjusted by inserting the bolt 71' in the proper opening 72'.

Upon the opposite side of the frame, and preferably opposite the lever 50 is a lever 92, pivoted to the frame and connected with a rod 93, leading to the engine, for controlling the supply of gasoline, and also the spark, if desired.

The operation of the tractor is as follows:

The rotation of the crank shaft 39 is imparted to the drive shaft 43, to rotate it in either direction. This drive shaft operates the differential gearing, which in turn drives the traction wheels. By shifting the gear 55 longitudinally it will disengage the annular gear 61, and hence disconnect the engine from the differential gear. The steering of the vehicle is accomplished by turning the hand-wheel 34, as is obvious.

It is to be understood that the form of my invention herewith shown and described is to be taken as a preferred example of the same, and that various changes in the shape, size, and arrangement of parts may be resorted to without departing from the spirit of my invention, or the scope of the subjoined claim.

Having thus described my invention, I claim:—

The combination with a wheeled frame, of depending bars connected with the frame and provided at their lower ends with inwardly extending horizontal portions, a lower transverse horizontal bar having its ends arranged beneath the inwardly extending portions and provided at its forward edge with an upstanding flange projecting above said portions, an upper transverse horizontal bar arranged upon said portions in spaced relation to the lower bar, bolts passing through the upper and lower bars and said inwardly extending portions serving to connect them, an apertured plate adapted for insertion between said upper and lower bars and provided at its rear end with apertured knuckles, a bolt passing through the upper and lower bars and through the aperture in said plate, a coupling sleeve formed U-shape in cross section and provided at its forward end with an apertured knuckle positioned between the first named knuckles, a pivot element passing through the apertured knuckles, a plow beam having its forward end arranged within the sleeve and secured therein, a bail pivoted to the frame and connected with the plow beam, and diagonal braces arranged upon opposite sides of the depending bars connected therewith.

In testimony whereof I affix my signature.

HANS LINDNER.